United States Patent
Carson

[11] 4,046,640
[45] Sept. 6, 1977

[54] POWER GENERATION AND POTABLE WATER RECOVERY FROM SALINOUS WATER

[75] Inventor: Don B. Carson, Mount Prospect, Ill.
[73] Assignee: UOP Inc., Des Plaines, Ill.
[21] Appl. No.: 744,064
[22] Filed: Nov. 22, 1976
[51] Int. Cl.$^2$ ............................................. B01D 3/06
[52] U.S. Cl. ........................... 203/11; 203/DIG. 20; 203/DIG. 1; 203/80; 203/91; 60/641; 60/648
[58] Field of Search .......... 203/11, DIG. 1, DIG. 20, 203/DIG. 17, 73, 80, 91; 60/641, 648; 202/234, 182; 159/15, 16, 24 A

[56] References Cited
U.S. PATENT DOCUMENTS

| | | | |
|---|---|---|---|
| 1,230,417 | 6/1917 | Lillie | 203/DIG. 20 |
| 3,468,762 | 9/1969 | Klitzsih | 203/DIG. 20 |
| 3,489,652 | 1/1970 | Williamson | 203/DIG. 20 |
| 3,531,939 | 10/1970 | James | 203/DIG. 20 |
| 3,928,145 | 12/1975 | Othmer | 203/11 |
| 4,009,082 | 2/1977 | Smith | 203/DIG. 20 |

*Primary Examiner*—Hiram H. Bernstein
*Attorney, Agent, or Firm*—James R. Hoatson, Jr.; Robert W. Erickson; William H. Page, II.

[57] ABSTRACT

A process for simultaneously generating power and recovering potable water from a source of salinous water — e.g. sea water. Salinous water, from a locus which is proximate to the surface of the source and at a relatively high temperature — e.g. about 85° F. — is exposed to radiant solar energy to increase significantly the temperature thereof — e.g. to a level of at least about 135° F. The heated water is introduced into a plurality of flash separation zones, each succeeding one of which is maintained at a lower subatomspheric pressure than the preceding zone, to provide substantially non-salinous vapor phases. The salinous liquid phase is introduced in series through the plurality of flash zones. The vapor phases are utilized to vaporize hydrocarbons, in separate vaporizers, and the hydrocarbon vapors are passed through separate, individual turbines, or are introduced into different stages of a multistage turbine, from the resulting motion of which power is generated. Hydrocarbon vapors exiting from the turbines are condensed via indirect heat-exchange with a second salinous water portion, obtained from a second depth substantially below the surface, and at a comparatively lower temperature — e.g. about 70° F. — and re-vaporized. The salinous liquid phase emanating from the last power flash zone is introduced into a separate vacuum flash separation zone, maintained at an absolute pressure less than that of the last flash zone in said plurality. The resulting vaporous phase, and those power flash vapors which were utilized to vaporize the hydrocarbons, are condensed, via indirect contact with the second salinous water portion, to recover potable liquid water.

The second salinous water portion, following condensation of the exiting turbine vapors, and the last obtained salinous liquid phase, from the separate flash separation zone, is returned to the original source of salinous water. The salinous liquid phase, returned to the sea water source, is at a temperature not more than 15° F. greater than the temperature of the colder second salinous water portion.

10 Claims, 1 Drawing Figure

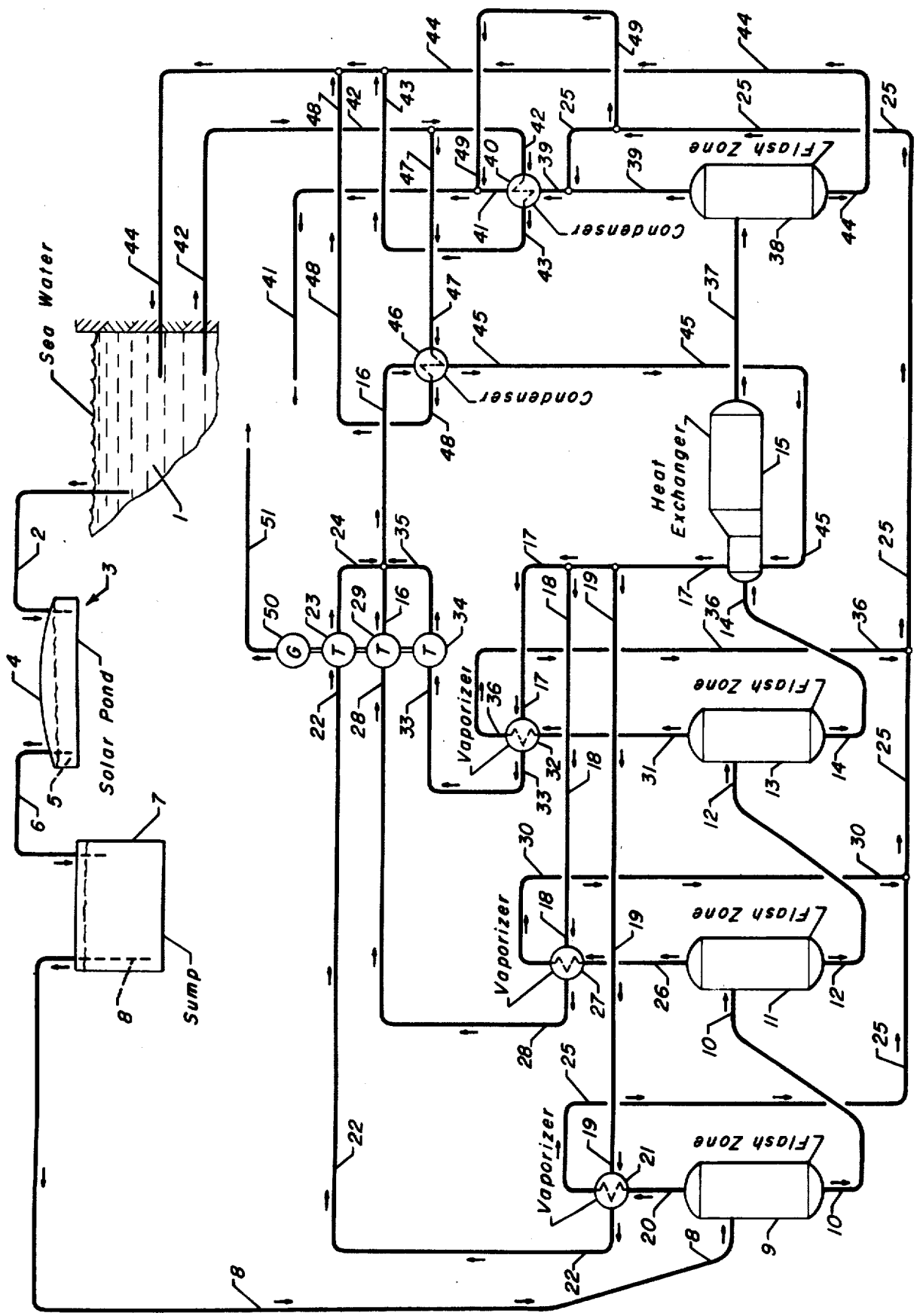

POWER GENERATION AND POTABLE WATER RECOVERY FROM SALINOUS WATER

* * APPLICABILITY OF INVENTION * *

The invention herein described is directed toward a technique for simultaneously generating power and recovering potable water from otherwise impotable water. Although applicable to the processing of many types of undrinkable, brackish water and/or water having a high degree of salinity, the inventive concept herein described is intended to be principally directed toward the generation of power and the recovery of potable water from sea water.

According to many knowledgeable scientific researchers, the world is currently entering into a period of time which future historians may well refer to as the "energy-shortage" era. Whether considering (1) the current availability of natural gas, (2) the sufficiency of oil reserves, or (3) heretofore untapped sources of coal, the consensus appears to indicate that a severe energy crisis is, or will soon become an established fact. One consequence is, of course, that a corresponding shortage of electrical power can be foreseen; that is, it no longer will be practical to convert one or more of the foregoing energy sources into electrical power. In order to alleviate this situation, consideration is currently being given to ocean thermal energy conversion. The basic concept, first proposed by a French physicist as early as 1881, involves the operation of a simple heat engine, using warm surface water as a heat source, and colder water, from the depths of the ocean, as the heat sink.

In a similar vein, many area of the world, especially those which can be characterized as arid, face a critical shortage of potable water, both for human consumption and for irrigation. Although sparsely located throughout many parts of the world, such areas abound particularly in the Middle-Eastern countries and in the Northern desert regions of Africa. Coincidentally, many of these countries, or at least localized sections thereof, either border upon, or are readily accessible to sea and/or ocean waters wherein natural thermal gradients exist. The process encompassed by my inventive concept, although not limited to installation in such areas, is primarily applicable thereto. Exemplary of such a locale is Saudi Arabia, the Western coast of which borders upon the Eastern shore of the Red Sea.

Briefly, the present invention involves the use of a combination of the available ocean thermal energy and the virtually limitless supply of natural solar energy. Initially, a first portion of salinous water from a locus which is proximate to the surface thereof, and at a relatively high temperature — e.g. in the range of about 60° F. (15.6° C.) to about 100° F. (37.8° C.) — is exposed to radiant solar energy to increase significantly the temperature thereof — e.g. to a level in the range of about 135° F. (56.8° C.) to about 210° F. (99° C.). The thus-heated water is introduced into a plurality of flash separation zones, each succeeding one of which is maintained at a lower subatmospheric pressure than the preceding flash zone. Substantially non-salinous vapor phases are provided, each of which is utilized to vaporize a hydrocarbon stream in separate vaporizers. The hydrocarbon vapors are passed through separate, individual turbines, or are introduced into different stages of a multi-stage turbine, from the resulting motion of which power is generated. Each of the resulting salinous liquid phases is passed through these power flash separation zones in series flow.

Hydrocarbon vapors exiting from the turbines are condensed via indirect heat-exchange with a second salinous water portion, obtained from a second depth substantially below the surface, at a comparatively lower temperature — e.g. from about 45° F. (7.2° C.) to about 85° F. (29.4° C.) — and are re-vaporized. The salinous liquid phase emanating from the last power flash zone is introduced into a separate vacuum flash separation zone, maintained at an absolute pressure less than that of the last flash zone in said plurality. The resulting vaporous phase, and those which were utilized to vaporize the hydrocarbons, are condensed, via indirect contact with the second salinous water portion, to recover potable liquid water.

The second salinous water portion, following condensation of the exiting turbine vapors, and the last obtained salinous liquid phase, from the separate flash separation zone, is returned to the original source of salinous water. The salinous liquid phase, returned to the sea water source, it at a temperature not more than 15° F. greater than the temperature of the second salinous water portion initially obtained from the sea, and preferably not more than about 10° F. greater. In a preferred processing technique, the last salinous liquid phase, from the power vacuum flash zones, is employed to preheat the hydrocarbons prior to introducing the liquid phase into the separate vacuum flash separation zone for the production of additional liquid potable water.

As hereinafter discussed in greater detail, a most important variable constitutes the temperature to which the surface water is increased within the solar radiation heat sink. Also of major importance is the temperature differential between the surface water and colder water selected from some finite depth below the surface. Regardless of the temperature of the salinous water charged to the initial flash separation zone, judicious operating techniques require the utilization of virtually all the resulting temperature differential with respect to the water obtained at the selected depth below the surface. To illustrate, where surface water is available at about 85° F. (29.4° C.) and colder, deeper water is obtainable at about 65° F. (18.3° C.), or a temperature differential of 20° F. (11.1° C.), and the surface water is increased to a temperature of about 170° F. (76° C.), available energy is lost and/or wasted where salinous water is returned to the source at a temperature substantially greater than that of the colder sea water. Likewise, the radiant energy absorbed in going from 85° F. to 170° F., a differential of 85° F., or a differential of 105° F. with respect to the colder water, should be utilized virtually 100.0%. The process encompassed by the present invention makes such utilization economically possible.

* * OBJECTS AND EMBODIMENTS * *

A principal object of the present invention involves the simultaneous generation of power and the recovery of potable water from a source of salinous water. A corollary objective resides in the utilization of a combination of solar energy with the natural temperature gradients existing at varying depths of the oceans and seas.

Another object is to provide a technique which affords economic enhancement over the use of natural gas or fossil fuels for the generation of electrical power. Still another object is directed toward increasing the effective degree to which the radiant solar energy absorbed in a solar radiation heat sink is utilized in conjunction with the available ocean thermal gradient.

These objects, as well as others, are achieved through a process for the simultaneous generation of power and the recovery of potable water from a source of salinous water which comprises the sequential steps of: (a) introducing a first salinous water portion, obtained from a first depth proximate to the surface of said source, into a solar radiation heat sink; (b) exposing said first salinous water portion, within said solar radiation heat sink, to radiant solar energy for a time sufficient to raise the temperature thereof to a level of at least about 135° F. (c) introducing the thus-heated salinous water into a plurality of vacuum flash separation zones, each succeeding one of which is maintained at a lower subatmospheric pressure than the preceding zone, (i) to provide substantially non-salinous vaporous phases equal in number to the number of flash separation zones and, (ii) wherein the salinous liquid phase is introduced in series through the plurality of zones; (d) vaporizing a hydrocarbon, via indirect contact with each of said non-salinous vaporous phases in separate vaporizers, and (i) passing each of the resulting vaporized hydrocarbon streams through a separate turbine, (ii) condensing the exiting hydrocarbon vapors via indirect heat-exchange with a second salinous water portion, obtained from a second depth substantially below the surface of said source, (iii) generating power from the resulting motion of said turbines and, (iv) revaporizing the resulting condensed hydrocarbons; (e) condensing said non-salinous vaporous phases, following vaporization of said hydrocarbons, to recover liquid potable water; (f) introducing the salinous liquid phase, emanating from the last flash separation zone in said plurality, into a separate vacuum flash zone, maintained at an absolute pressure less than that of the last flash zone in said plurality; and, (g) condensing the resulting non-salinous vaporous phase, via indirect heat-exchange with said second salinous water portion, and recovering additional liquid potable water.

In another embodiment, the hydrocarbon stream is pre-heated via indirect heat-exchange with the salinous liquid phase, emanating from the last flash separation zone prior to introducing the salinous liquid phase into the separate vacuum flash separation zone.

In a more specific embodiment, my inventive concept encompasses a process for the simultaneous generation of power and the recovery of potable water from a source of salinous water which comprises the sequential steps of: (a) introducing a first salinous water portion, obtained from a first depth proximate to the surface of said source, into a solar radiation heat sink; (b) exposing said first salinous water portion, within said solar radiation heat sink, to radiant solar energy for a time sufficient to raise the temperature thereof to a level of at least about 160° F.; (c) introducing the thus-heated salinous water into a first vacuum flash separation zone, maintained at a subatmospheric pressure in the range of about 2.5 psia. to about 8.5 psia., to provide a first non-salinous vaporous phase and a first salinous liquid phase, and (i) vaporizing a hydrocarbon via indirect heatexchange with said first vaporous phase and, (ii) passing the resulting hydrocarbon vapors through a first turbine; (d) introducing said first liquid phase into a second vacuum flash separation zone, maintained at a subatmospheric pressure in the range of about 1.5 psia. to about 5.5 psia., to provide a second non-salinous vaporous phase and a second salinous liquid phase, and (i) vaporizing a hydrocarbon via indirect heat-exchange with said second vaporous phase and, (ii) passing he resulting hydrocarbon vapors through a second turbine; (e) introducing said second liquid phase into a third vacuum flash separation zone, maintained at a subatmospheric pressure of from about 0.9 psia. to about 3.5 psia., to provide a third nonsalinous vaporous phase and a third salinous liquid phase, and (i) vaporizing a hydrocarbon via indirect heat-exchange with said third vaporous phase and, (ii) passing the resulting hydrocarbon vapors through a third turbine; (f) generating power from the resulting motion of said first, second and third turbines; (g) condensing said first, second and third vaporous phases, following vaporization of said hydrocarbons, to recover liquid potable water; (h) introducing said third liquid phase into a fourth vacuum flash separation zone, maintained at a subatmospheric pressure of about 0.35 psia. to about 0.75 psia., to provide a fourth non-salinous vaporous phase and a fourth liquid phase; and, (i) condensing said fourth vaporous phase via indirect heat-exchange with said second salinous water portion, and recovering additional liquid potable water.

These, as well as other objects and embodiments, will become evident to those possessing the requisite skill in the appropriate art, from the following detailed description of the present invention. First, however, a discussion of known applicable prior art is believed to be warranted.

* * PRIOR ART * *

It would appear that the greater proportion of available prior art consists of articles published in various trade and scientific journals. Two examples of these will be discussed hereinbelow. With respect to issued patents, these appear to be principally directed toward various devices capable of utilizing radiant solar energy for (1) heating homes and other types of structures, and, (2) the desalination of non-potable water. For example, respecting the latter, U.S. Pat. No. 2,803,591 (Cl. 202-234), issued Aug. 20, 1975, directs itself to a form of solar still for the purification of undrinkable water. This impure water in introduced, via spraying, into a closed and well-insulated chamber containing hot, dry air which becomes enriched with water vapor. The saturated hot air is withdrawn and cooled, yielding a condensate which is recovered as potable water. The device utilizes a series of mirrors to concentrate the rays of the sun for the purpose of heating the air which is introduced into the spray chamber.

In U.S. Pat. No. 2,813,063 (Cl. 202-234), issued Nov. 12, 1957, there is described a solar still having a wick which becomes saturated with salt water. Solar radiation heats the wick and causes the evaporation of water. The still is constructed from a semi-rigid, flexible material such as polyethylene, and is transparent with respect to solar radiation. A similar solar still, absent the wick, is illustrated in U.S. Pat. No. 2,848,389 (Cl. 202-234), issued Aug. 19, 1958.

An article entitled "Efforts to Tap Ocean Thermal Energy Gain", *Chemical and Engineering News*, Feb. 9, 1976, pp. 19-20, in part discusses the use of available ocean thermal gradients. In one particular system, a working fluid such as propane or ammonia is employed in a closed Rankine cycle. Warm surface water passes through a heat exchanger-evaporator, causing vaporization of the working fluid. The vapor is then expanded in a turbine to generate a electric power. From the turbine, the vapor passes to a heat exchanger-condenser, wherein it is cooled and condensed by cold deep ocean water, and recycled to the heat exchanger-evaporator. Since the maximum differential temperature between surface water and deep water is not appreciably greater than 40° F., this technique suffers from an extremely low thermodynamic cycle efficiency, and is, therefore, impractical on a commercial scale.

Of further interest is an article entitled "Desalination of Sea Water Using Solar Radiation Under Retarded Evaporation Conditions", *Industrial Engineering Chemistry, Process Design Development*, Volume 14, No. 4, 1975, pp. 351-358. Described is a desalination process which primarily uses the temperature difference between the surface sea water and the deep sea water. A shallow pond, swamp area, or a large heating flat is proposed for use as the radiant solar energy sink. Water, from the surface, is pumped into the pond where it is heated by solar radiation. An insoluble monolayer, or a thin, transparent plastic sheet on the water surface is suggested for suppressing the evaporative heat loss from the water layer. The heated water is fed into a heat exchanger which is a vacuum chamber. The warm sea water partly flash evaporates while it runs down a packed section. The vapor condenses in an adjoining section over cooling coils being supplied with cold deep sea water, which cooling water is returned to the sea. Noted is the fact that there is no provision for the simultaneous generation of power from the flashed vapors.

U.S. Pat. No. 3,928,145 (Cl. 203-11), issued Dec. 23, 1975, is specifically referred to in an article entitled "Power, Fresh Water and Food from the Sea", *Mechanical Engineering*, September, 1976, pp. 27-34. All of the subject matter which appears in the article can be found in the issued patent, the latter being more inclusive. Therefore, the discussion which follows will be specifically directed toward the pertinency of the issued patent, from which the present invention can be readily distinguished. As initially described, in general terms, combined use is made of solar radiation and the thermal gradients existing between surface and deep sea water. Warm surface water, from tropic seas, is increased in temperature through the use of a solar heater; the heated sea water is flash evaporated, or boiled at subatmospheric pressure. Sensible heat of the water leaves as vaporous heat, and the steam formed, as the sea water cools, expands to a lower pressure in a turbine, or other steam engine which drives a generator. The exit vapors are passed into a condenser wherein they are condensed via indirect heat-exchange with cold water from the depths of the sea. As an integral part of the process, the heated sea water from the condenser is introduced into a mariculture system which produced at least one specie of food fish; water from the mariculture operation is passed into the solar heater and therefrom into the flash boiler, the discharge water from which is returned to the sea.

Briefly referring to the accompanying drawing, the sole FIGURE presented is illustrative of a particularly preferred embodiment of the present invention. By comparison the foregoing, it becomes quite clear that there is no prior art recognition of multiple flash separation zones for the generation of power and the simultaneous recovery of potable water. Referring again to U.S. Pat. No. 3,928,145, a so-calld multiple flash evaporator is described; it is, however, intended solely for maximizing fresh water recovery, without any power generation. As stated in this reference, surface sea water is available at 86° F. (30° C.), and may be increased in temperature to about 95° F. (35° C.) by admixing therewith the warm water effluent from the mariculture pools, or to 175° F. (78.8° C.) by flowing ponds having black bottoms and transparent covers. When utilizing a single flash evaporation zone to generate power and recover potable water, the sea water becomes cooled to a temperature of 77° F. (25° C.); at this temperature, the subatmospheric pressure within the flash evaporator is 0.46 psia. (23.8 mm. of Hg.). The resulting vaporous phase is passed through a turbine, and the exit vapors condensed to 59° F. (15° C.) using cold sea water which is available at a temperature of 41° F. (5° C.), the latter (following condensation) increases in temperature to 50° F. (10° C.). The resulting flash evaporated liquid phase, at 77° F. (25° C.), is directly returned to the source of the sea water. In so doing, the disclosed process effectively wastes the available 18° F. temperature differential between 59° F. and 77° F., by not contemplating a second flash evaporation of the 77° F. liquid phase down to 59° F. This would be effected at a subatmospheric pressure of about 0.25 psia. (12.9 mm. of Hg.), to recover additional amounts of potable water. In effect, there exists a waste of about 18 BTU/lb. of water.

Further in view of the fact that only one flash evaporation stage is employed for power production, the process will actually generate very little power. As a general proposition, the work developed in the turbine is proportional to the ratio of the pressures across the turbine; that is, the ratio of the pressure of the vapors introduced into the turbine to the pressure of the vapors exiting therefrom. By using a single turbine, the disclosed procedure has an effective pressure ratio closely approximating 0.46/0.25, or 1.84:1.0. As above stated, the reference contemplates multiple flash stages only to increase the recovery of water; it is, therefore, concerned solely with multiple condensation stages. In short, by not employing a final flash to the lowest possible temperature, the disclosed process does not recover all the potable water possible. The quantity of power generated falls short of the maximum available in view of the fact that a plurality of power flash stages is not employed. Another significant difference between the present process and that of the prior art, and which leads to results which are unavailable in the latter, is that a salinous liquid phase, after vaporizing a hydrocarbon, is introduced into a separate flash chamber to provide a final vaporous phase which is condensed to recover additional liquid potable water.

* * SUMMARY OF INVENTION * *

The present invention offers a feasible process which is capable of currently being commercially acceptable. With respect to the technology demand imposed upon an installation of given capacity, there is afforded great flexibility with respect to the relative amount of generated power and the quantity of potable water recovered. That is, a commercially designed system, having a solar radiation heat sink, in the form of a shallow solar pond, receiving solar insolation in the amount of about 3,000 BTU/sq.ft./day, can readily be operated to produce from about 3,000 kw. to about 11,200 kw. of power, or more, depending upon the load demand. The recovery of potable water generally decreases somewhat as the generated power increases; while there appears to be no direct correlation, potable water is recoverable in amounts which range from about 800,000 gal/day to about 1,600,000 (1.6 MM gal./ day.) While the particular design of any given system is most certainly affected by existing economic considerations in the locale of the installation, being principally the particular value placed upon power and potable water, other factors must generally be considered. Fundamental to the process herein described, is the plurality of power flash separation zones followed by a separate flash zone for additional potable water recovery. With respect to the former, three flash separation zones produce more power than two, but less power than four. By the same token, six power flash zone produce less power than seven, but more power than five. Capital expenditure, however, obviously increases as the number of individual zones in the power flash evaporation system increases. Of great significance is, however, final flash evaporation at the lowest practical subatmospheric pressure to produce additional potable water.

In the discussion which follows, several operational variables have been arbitrarily selected in order to form a basis for illustration. In addition to the character and size of the solar radiation heat sink, these variables are: (1) surface water at a temperature of 85° F.; (2) colder, deeper water at a temperature of 70° F.; (3) heated surface water at a temperature of 200° F.; and, (4) a final flash evaporation at 0.51 psia. to a temperature of 80° F. for additional water recovery. With respect to the latter, a flash evaporation at 0.43 psia. results in a temperature of 75° F., while one at 0.39 psia. results in a temperature of 72° F. Briefly, as hereinbefore stated, the present process involves the combinative utilization of ocean thermal gradients and solar radiation for the simultaneous generation of power and the recovery of potable water. Where a sufficient thermal gradient, at least about 15° F., is not available, certain modifications can be made to achieve the desired end result of power generation accompanied by potable water recovery. However, where temperature differentials of about 15° F. to about 40° F. exist (the latter generally considered the practical maximum available), the present technique affords enhancement in overall efficiency, especially at the higher temperature gradients.

Initially, surface water is introduced into a solar radiation heat sink, the exact dimensions of which are primarily dependent upon the available insolation. Insolation may be conveniently expressed as the quantity of B.T.U.'s, from the sun, falling upon a square foot of heat sink surface per day, or the incidence of solar energy. Solar radiation heat sinks may take the form of flat plate collectors, or in the interest of capital investment, a shallow solar pond. The latter constitutes an economical device for capturing a portion of the insolation falling upon it from the sun, whenever only moderate temperatures of the heated water are required. Surface sea water is pumped into the solar pond to a depth which varies seasonally, much the same as the insolation from the sun varies seasonally. Depending upon the season, as well as the desired temperature of the heated water, a pond depth in the range of about one to about ten inches is acceptable, although a solar pond depth from two to about eight inches appears to be the most practical. The length and width of the solar pond are generally determined by the terrain and climate which are peculiar to the locale of the unit. The temperature to which the water in the solar pond is heated, prior to being charged to the process, depends upon the relative quantities of potable water and generated power which the selected installation is designed to deliver. For example, a solar pond receiving insolation in the amount of 3,000 BTU/sq.ft./day, and functioning at an efficiency of about 60.0%, would heat a three-inch level of water from about 85° F. up to about 200° F. during a period of approximately 10 daylight hours. Solar pond efficiency is determined by comparing its absorptivity with the total insolation available, and should be such that the sea water attains a temperature level of at least about 135° F.

In order to increase the efficiency of the solar pond, evaporative heat loss therefrom is inhibited through the use of a covering. Suitable coverings are those which are transparent to solar radiation, while simultaneously being opaque to long wave radiation. Additionally, a suitable covering will provide an insulating effect between the water being heated and the atmosphere, such that conductive and convective heat loss is minimized. For example, one such suitable covering would be hollow glass balls, or beads having a nominal diameter of about ¼ -inch to about ½ -inch, disposed in a layer from about ¼ -inches to about 2 inches thick. A relatively thin (four to about six mils) sheet of polyvinyl chloride can be suitably employed, as can two such sheets which are uniformly tacked to provide a multitude of air bubbles having a minimum air gap of about one inch. The plastic sheet can be used in combination with an underlayer of acrylic, fiberglass, polyvinyl carbonate, or other plastic which is opaque to long wave radiation, and which is formed into a modified sine wave having angles of about 45° to about 75°. Other suitable coverings include glass wool which is reinforced with plastic, opaque to long wave radiation, in combination with a tacked polyvinyl chloride sheet; a mat of fused polyvinyl chloride bubbles, about 1 to 2 inches thick; and, a combination of polyvinyl chloride-coated fiberglass to which the polyvinyl sheet is uniformly tacked.

Also of importance, with respect to the efficiency of a solar pond, is the insulation of the sides and bottom thereof. Several techniques to accomplish this will become evident to those possessing the requisite skill in the appropriate art. For instance the solar pond can be lined with a thin, black sheet of polymeric material, such as polyethylene, polyvinyl chloride, polyvinyl carbonate, etc., disposed over a layer of dry sand, crushed shells, etc. A variety of commercially available insulating material, such as styofoam, vermiculite, etc., can be used as the lining over which the black sheet of polymeric material is placed. Insulating material can be foamed on and thus become integral with the polymeric sheet, or the polymeric material can be impregnated with an inorganic substance having a high absorptivity/emissivity ratio; this may be copper oxide, nickel oxide, black nickel, etc.

Following the prescribed period of exposure to solar radiation, during which the temperature of the surface sea water in the pond is increased to a level of at least about 135° F. (56.8° C.), and at such time as the water has reached its maximum temperature for the day, the heated salinous water is drained into a hot water storage pond, or sump. The size of the sump depends upon the design capacity of the unit; however, it should be capable of storing at least a 24 - hour supply of the heated salinous water. To reduce the loss of energy from the surface of the sump, it is preferred that the depth thereof be significantly greater than its length and width. Furthermore, the storage pond should be covered and lined much the same as the solar pond.

In further describing my invention, it will be assumed that surface sea water is available at a temperature of about 85° F. (29.4° C.) and that the temperature about 450 feet below the surface is approximately 70° F. Also, that insolation from the sun, at the period of the year being considered, is at least 3,000 BTU/sq.ft./day, and that a reasonably efficient (about 50.0%) solar pond is being employed as the solar radiation heat sink. The solar pond will be one which covers about 200 acres and has a depth of about two and one-half inches; during approximately ten hours of daylight, this pond would heat 113 MM lbs. (51.37 MM kg.) of surface water, 13.2 MM gal./day, from its initial temperature to about 200° F. (93° C.). The storage pond, or sump will be sized for a capacity of at least this amount in order to accommodate the daily hot water make.

As hereinbefore stated, the basic prior art processing technique involves charging the heated salinous water into a flash separation zone which is maintained under subatmospheric pressure. This provides a non-salinous vaporous phase, which is passed through a turbine, and a salinous liquid phase which is returned to the source of the sea water. In accordance with my invention, the flash separation zone preferably consists of multiple power flashes in a plurality of vacuum flash zones, functioning in series with respect to the salinous liquid phase, each succeeding one of which is maintained at a lower subatmospheric pressure. This increases both the overall efficiency of the process and the quantity of generated poer, albeit accompanied by some decrease in the amount of potable water which is recovered. Thus, for instance, where the flash separation zone is a single vessel maintained at about 2.89 psia. (149 mm. of Hg.), the vapors will pass through the turbine at about 140° F., and about 6,000 kw., or about 8,000 HP will be generated from the resulting motion thereof. The vapors, after being cooled via indirect heat-exchange with sea water at about 70° F., result in the recovery of about 800,000 gal./day of potable water. Where the initial power flash is effected at 2.89 psia., with the resulting liquid phase being flashed at 0.51 psia. (26.4 mm. of Hg.), in a second zone, power is still generated in an amount of about 8,000 HP (about 5,950 kw.), but the potable water recovery increases to an amount of about 1.53 MM gal./day.

As hereinafter discussed, with specific reference to the accompanying drawing, it is preferred to effect the power flash in a plurality of vacuum flash zones. In the drawing, three such power flash zones are illustrated, with the resulting three vaporous phases being utilized in three separate vaporizers as the heat-exchange medium to vaporize separate hydrocarbon streams. The hydrocarbon vapors are passed through multiple turbine stages, or separate turbines functioning in tandem. In this technique, where solar radiation has increased the surface water temperature to a level of about 200° F. (90° C.), the final power flash will be effected at a subatmospheric pressure of about 2.5 psia. (129 mm. of Hg.) to about 3.5 psia. (181 mm. of Hg.). The initial vacuum flash separation zone is maintained at a subatmospheric pressure of about 6.5 psia. (336 mm. of Hg.) to about 8.5 psia. (440 mm. of Hg.), while the intermediate flash evaporation is effected at a subatmospheric pressure in the range of about 4.0 psia. (207 mm. of Hg.) to about 5.5 psia. (284 mm. of Hg.). The salinous liquid phase, emanating from the last power flash separation zone, will be at a temperature of about 134° F. (56° C.) to about 148° F. (58.5° C.). This liquid phase is employed, via indirect heat-exchange, to pre-heat a hydrocarbon — e.g. butane — which is divided into three portions, each of which is separately vaporized via indirect heat-exchange with one of the three vaporous phases provided by the three power flash zones. Following its use in pre-heating the hydrocarbon stream, the final liquid phase, at a temperature in the range of about 126° F. (52.3° C.) to about 140° F. (60° C.) , is introduced into a separate vacuum flash zone maintained at a subatmospheric pressure of about 0.35 psia. (18.1 mm. of Hg.) to about 0.75 psia. (38.8 mm. of Hg.). The resulting vaporous phase is combined with the first three vaporous phases, following hydrocarbon vaporization, and cooled and/or condensed to recover potable water. Power is generated in an amount of about 13,660 HP. (10,184 kw.), and liquid potable water is recovered in an amount of about 1.44 MM gal./day.

By way of further illustrating the foregoing, and assuming a solar radiation heat sink which raises the surface water to a temperature of about 135° F. (56.8° C.), two power flash zones will be sufficient. The first will function at about 1.69 psia. (87.4 mm. of Hg.), to produce vapors and a liquid phase at a temperature of about 120° F. (49° C.); the liquid phase is flashed in the second separation zone at about 1.10 psia. (56.9 mm. of Hg.), to produce additional vapors and a second liquid phase at a temperature of about 105° F. (40.6° C.). The second liquid phase is employed to vaporize a hydrocarbon, as hereinbefore stated, and, to increase the recovery of potable water, subjected to a final vacuum flash separation (following its use as the heat-exchange medium) at about 0.51 psia. (26.4 mm. of Hg.), of to a temperature of about 80° F. (26.7° C.).

Where the heated water is available at a temperature of 160° F. (71° C.), three power flash zones are conveniently employed at pressures of about 2.89 psia. (149.5 mm. of Hg.), 1.69 psia. (87.4 mm. of Hg.) and about 0.95 psia. (49.1 mm. of Hg.). The liquid phase from the third zone is then utilized in the hydrocarbon vaporization cycle. It is then flushed at a pressure of about 0.51 psia. (26.4 mm. of Hg.), to recover additional potable water. The final salinous liquid phase, at about 80° F. (26.7° C.), is returned to the original source of sea water. When so returned, its temperature should not be more than 15° F. greater than the temperature of the sea water obtained from a depth below the surface. Preferably, the temperature of the final liquid phase will not be more than 10° F. greater than that of the colder, deeper sea water.

Preferred classes of hydrocarbons are paraffins and mono-olefins containing from about one to about four carbon atoms per molecule, and include, therefore, methane, ethane, ethylene, propane, propylene, butane and butylene (including its isomers), as well as mixtures thereof. Especially preferred are propane, propylene, butanes and/or butylenes. Halogenated hydrocarbons, containing fluorine and/or chlorine, most of which are categorized under the generic name "Freon" (a trademark for a line of fluorinated hydrocarbons) may also be employed in the hydrocarbon system, or vaporization cycle. Exemplary of these halogenated hydrocarbons are trichloromonofluoromethane, dichlorodifluoromethane, monochlorotrifluoromethane, monobromotrifluoromethane tetrafluoromethane, monochlorodifluoromethane, trichlorotrifluoroethane, dichlorotetrafluoroethane, octafluorocyclobutane, tetrachlorodifluoroethane, etc.

In accordance with the present invention, sea water, at a temperature of about 85° F., is introduced into the solar pond wherein the temperature is increased to a level in the range of about 135° F. (56.8° C.) to about 200° F. (93° C.). The heated sea water passes into the storage pond, or sump, from which it is charged to the unit at the designed hourly rate. As previously set forth, the initial temperature of the heated sea water will be primarily dependent upon (1) the surface temperature of the sea water, (2) the efficiency of the solar pond and, (3) the resistance of the storage pond to radiation losses. Power will be generated, and potable water recovered as a result of a temperature increase of as little as 50 ° F.; however, it is readily apparent that the higher the temperature, the more efficient the process and the greater the generation of power and recovery of potable water. Preferably, the present invention involves the use of three individual vacuum flash zones for power generation; the first zone, into which the heated sea water is initially introduced, will be maintained at a subatmospheric pressure in the range of about 2.5 psia. (129.3 mm. of Hg.) to about 8.5 psia. (440 mm. of Hg.). The second power flash zone will function at a subatmospheric pressure in the range of about 1.5 psia. (77.8 mm. of Hg.) to about 5.5 psia. (284 mm. of Hg.), while the third flash zone is maintained at a level of about 0.9 psia. (46.5 mm. of Hg.) to about 3.5 psia. (181 mm. of Hg.). The final salinous liquid phase, at a temperature of at least about 90° F. (32.2° C.), is used to preheat the hydrocarbon stream and then is introduced into the separate vacuum flash zone which is maintained at a subatmosperic pressure of about 0.35 psia. (18.1 mm. of Hg.) to about 0.75 psia. (38.8 mm. of Hg.). As will be recognized from the foregoing, the process offers heretofore unavailable flexibility respecting the comparative quantities of generated power and potable water recovered from a given capacity unit.

In additionally describing my invention, reference will be made to the accompanying drawing which illustrates several embodiments thereof. These are presented by way of a simplified, schematic flow diagram in which details such as pumps, instrumentation and controls, valving, start-up lines and similar hardware have been eliminated on the grounds of being non-essential to a clear understanding of the techniques involved. The utilization of these miscellaneous appurtenances, to modify the illustrated process, is well within the purview of one skilled in the appropriate art, and the use thereof will not create a departure from the scope and the spirit of the appended claims.

* * DESCRIPTION OF DRAWING * *

With specific reference now to the drawing, the sole FIGURE represents a particularly preferred embodiment wherein a plurality of power flash zones, 9, 11 and 13, are employed to produce three vaporous phases which are passed through vaporizers 21, 27 and 32, respectively. Surface sea water, from a source 1, at a temperature of about 85° F. (29.5° C.), is introduced via line 2 into solar pond 3. The solar pond, having a covering 4 (as previously described), is sized to absorb 1,500 BTU/sq.ft./ day of solar energy, and accept 113 MM lbs. (51.36 MM kg.) per 24-hour day, of salinous water. The heated water 5, at a temperature of about 200° F. (93° C.), is introduced via line 6, into sump 7, from which it is passed into flash separation zone 9 by way of line 8. The rate of salinous water entering zone 9 is about 4.7 MM lbs./hr. (2.14 MM kg./hr.), and the zone functions at a subatmospheric pressure of about 7.51 psia. (388 mm. of Hg.). The resulting non-salinous vaporous phase passes via line 20 into vaporizer 21, wherein it vaporizes a hydrocarbon in line 19. Hydrocarbon vapors are introduced, by way of line 22, into and through turbine 23 — the downstream subatmospheric pressure relative to turbine 22 (as well as turbines 29 and 34) is 0.51 psia. (26.4 mm. of Hg.).

The salinous liquid phase from flash zone 9, at a temperature of about 180° F. (83° C.), passes through line 10 into vacuum flash zone 11, being maintained under a subatmospheric pressure of about 4.74 psia. (245 mm. of Hg.). Additional non-salinous vapors pass via line 26 into hydrocarbon vaporizer 27. Hydrocarbons in line 18 are vaporized, and the vapors are introduced by way of line 28 into and through turbine 29. The salinous liquid phase in line 12, at a temperature of 160° F. (71° C.), is introduced into the third power flash zone 13, being maintained at a subatmospheric pressure of about 2.89 psia. (149 mm. of Hg.). Non-salinous vapors are introduced, via line 31, into vaporizer 32, and hydrocarbons from line 17 are vaporized thereby. The hydrocarbon vapors, in line 33, are introduced into and through turbine 34. Turbines 23, 29 and 34 function in tandem, or as different stages of a multiple-stage turbine, and the resulting motion generates power via generator 50 and line 51.

The last salinous liquid phase, from vacuum flash zone 13, at a temperature of about 140° F. (60° C.), passes by way of conduit 14 into heat-exchanger 15, wherein hydrocarbons in line 45 are preheated. These preheated hydrocarbons are withdrawn through line 17. A first portion is diverted through line 19, to be vaporized in vaporizer 21; a second portion is diverted through line 18, to be vaporized in vaporizer 27; and, the remainder continues through line 17, to be vaporized in vaporizer 32. Hydrocarbon vapors exiting turbine 23 and 34, via lines 24 and 35 respectively, are combined with the vapors exiting turbine 29 via line 16. The mixture continues through line 16 into condenser 46, wherein indirect contact is made with 70° F. sea water in line 47; the condensed hydrocarbons pass through line 45 into heat-exchanger 15, wherein they are preheated via indirect contact with the salinous liquid phase in line 14, as above set forth.

The last salinous liquid phase from flash zone 13, following its use to preheat the hydrocarbons in heat-exchanger 15, is introduced, at a temperature of about 132° F. (55.1° C.), into a separate vacuum flash zone 38 by way of conduit 37. This flash zone is maintained at a subatmospheric pressure of about 0.51 psia. (26.4 mm. of Hg.). The resulting non-salinous vapors in line 39 are introduced into condenser 40, and potable liquid water is recovered in line 41; condensation is effected through the use of 70° F. sea water obtained from source 1 through line 42. A portion thereof is diverted through line 47 to be used for condensing the hydrocarbons in condenser 46; the sea water emanating from condensers 40 and 46, are returned to source 1 via lines 43 and 48, respectively.

The vaporous phase from flash zone 9, following its use to vaporize hydrocarbons in vaporizer 21, is withdrawn via line 25, admixed with the vaporous phase in line 30 (from vaporizer 27) and the vaporous phase in line 36 (from vaporizer 32). The mixture continues through line 25 to be admixed with the vaporous phase in line 39, and is cooled and/or condensed therewith in condenser 40. As an alternative, the vaporous phases in line 25 may be diverted in part, or in total through line 49, and admixed thereby with the condensate in line 41.

The foregoing specification, particularly when read in light of the accompanying drawing, is believed to present a concise definition and a clear understanding of the present invention for the simultaneous generation of power and the recovery of liquid potable water from salinous sea water.

I claim as my invention:

1. A process for the simultaneous generation of power and the recovery of potable water from a source of salinous water which comprises the sequential steps of:
   a. introducing a first salinous water portion, obtained from a first depth proximate to the surface of said source, into a solar radiation heat sink;
   b. exposing said first salinous water portion, within said solar radiation heat sink, to radiant solar energy for a time sufficient to raise the temperature thereof to a level of at least about 135° F.;
   c. introducing the thus-heated salinous water into a plurality of vacuum flash separation zones, each succeeding one of which is maintained at a lower subatmospheric pressure than the preceding zone, (i) to produce substantially non-salinous vaporous phases equal in number to the number of flash separation zones and, (ii) wherein the salinous liquid phase is introduced in series through the plurality of zones;
   d. vaporizing a hydrocarbon via indirect contact with each of said non-salinous vaporous phases, in separate vaporizers, and (i) passing each of the resulting vaporized hydrocarbon streams through a separate turbine, (ii) condensing the exiting hydrocarbon vapors via indirect heat-exchange with a second salinous water portion, obtained from a second depth substantially below the surface of said source, (iii) generating power from the resulting motion of said turbines and, (iv) re-vaporizing the resulting condensed hydrocarbon;
   e. condensing said non-salinous vaporous phases, following vaporization of said hydrocarbons, to recover liquid potable water;
   f. introducing the salinous liquid phase emanating from the last flash separation zone in said plurality into a separate vacuum flash zone, maintained at an absolute pressure less than that of the last flash zone in said plurality; and,
   g. condensing the resulting non-salinous vaporous phase, via indirect heat-exchange with said second salinous water portion, and recovering additional liquid potable water.

2. The process of claim 1 further characterized in that said non-salinous vaporous phases, following vaporization of said hydrocarbons, are admixed with the non-salinous vaporous phase, from said separate vacuum flash zone, and condensed therewith to recover liquid potable water.

3. The process of claim 1 further characterized in that said non-salinous vaporous phases, following vaporization of said hydrocarbons, are admixed with the condensed vaporous phase from said separate vacuum flash zone to recover liquid potable water.

4. The process of claim 1 further characterized in that said hydrocarbon is preheated via indirect heat-exchange with the salinous liquid phase, emanating from the last flash separation zone prior to introducing said salinous liquid phase into said separate vacuum flash zone.

5. The process of claim 1 further characterized in that said second salinous water portion, following condensation of said turbine exit vapors and condensation of the vaporous phase from said separate vacuum flash zone, is returned to the source of said salinous water.

6. The process of claim 1 further characterized in that said hydrocarbon contains from one to about four carbon atoms per molecule.

7. The process of claim 1 further characterized in that said hydrocarbon is halogenated.

8. The process of claim 1 further characterized in that said solar radiation heat sink is a flat plate collector.

9. The process of claim 1 further characterized in that said solar radiation heat sink is a shallow solar pond.

10. A process for the simultaneous generation of power and the recovery of potable water from a source of salinous water which comprises the sequential steps of:
   a. introducing a first salinous water portion, obtained from a first depth proximate to the surface of said source, into a solar radiation heat sink;
   b. exposing said first salinous water portion, within said solar radiation heat sink, to radiant solar energy for a time sufficient to raise the temperature thereof to a level of at least about 160° F.;
   c. introducing the thus-heated salinous water into a first vacuum flash separation zone, maintained at a subatmospheric pressure in the range of about 2.5 psia. to about 8.5 psia., to provide a first non-salinous vaporous phase and a first salinous liquid phase, and (i) vaporizing a hydrocarbon via indirect heat-exchange with said first vaporous phase and, (ii) passing the resulting hydrocarbon vapors through a first turbine;
   d. introducing said first liquid phase into a second vacuum flash separation zone, maintained at a subatmospheric pressure in the range of about 1.5 psia. to about 5.5 psia., to provide a second non-salinous vaporous phase and a second salinous liquid phase, and (i) vaporizing a hydrocarbon via indirect heat-exchange with said second vaporous phase and, (ii) passing the resulting hydrocarbon vapors through a second turbine;
   e. introducing said second liquid phase into a third vacuum flash separation zone, maintained at a subatmospheric pressure of from about 0.9 psia. to about 3.5 psia., to provide a third non-salinous vaporous phase and a third salinous liquid phase, and (i) vaporizing a hydrocarbon via indirect heat-exchange with said third vaporous phase and, (ii) passing the resulting hydrocarbon vapors through a third turbine;
   f. generating power from the resulting motion of said first, second and third turbines;
   g. condensing said first, second and third vaporous phases, following vaporization of said hydrocarbons, to recover liquid potable water;
   h. introducing said third liquid phase into a fourth vacuum flash separation zone, maintained at a subatmospheric pressure of about 0.35 psia. to about 0.75 psia., to provide a fourth non-salinous vaporous phase and a fourth liquid phase; and,
   i condensing said fourth vaporous phase, via indirect heat-exchange with said second salinous water portion, and recovering additional liquid potable water.

* * * * *